(12) United States Patent
Schwarz

(10) Patent No.: US 12,206,787 B2
(45) Date of Patent: Jan. 21, 2025

(54) SYSTEM AND METHOD FOR IDENTIFYING VIRTUAL GOODS

(71) Applicant: Brand Therapy LLC, Hastings on Hudson, NY (US)

(72) Inventor: Jaime Schwarz, New York, NY (US)

(73) Assignee: BRAND THERAPY, LLC, Hastings on Hudson, NY (US)

( * ) Notice: Subject to any disclaimer, the term of this patent is extended or adjusted under 35 U.S.C. 154(b) by 548 days.

(21) Appl. No.: 17/585,630

(22) Filed: Jan. 27, 2022

(65) Prior Publication Data

US 2022/0150071 A1 May 12, 2022

Related U.S. Application Data

(63) Continuation-in-part of application No. 16/182,751, filed on Nov. 7, 2018, now Pat. No. 11,270,318.

(60) Provisional application No. 62/747,198, filed on Oct. 18, 2018, provisional application No. 62/582,950, filed on Nov. 8, 2017.

(51) Int. Cl.
| | |
|---|---|
| *H04L 9/32* | (2006.01) |
| *G06F 21/10* | (2013.01) |
| *G06Q 50/18* | (2012.01) |
| *H04L 9/00* | (2022.01) |

(52) U.S. Cl.
CPC ............ *H04L 9/3236* (2013.01); *G06F 21/10* (2013.01); *G06Q 50/184* (2013.01); *H04L 9/50* (2022.05)

(58) Field of Classification Search
CPC ....... H04L 9/3236; H04L 9/50; H04L 9/3239; H04L 9/3268; G06F 21/10; G06Q 50/184

USPC .......................................................... 705/50
See application file for complete search history.

(56) References Cited

U.S. PATENT DOCUMENTS

| 10,102,526 | B1 | 10/2018 | Madisetti |
|---|---|---|---|
| 10,204,339 | B2 | 2/2019 | Madisetti |
| 2013/0191178 | A1 | 7/2013 | Thompson |

(Continued)

FOREIGN PATENT DOCUMENTS

| CN | 1858757 A | 11/2006 |
|---|---|---|
| CN | 105096175 A | 11/2015 |

(Continued)

OTHER PUBLICATIONS

Musabirov et al., "Deconstructing Cosmetic Virtual Goods Experiences in Dota 2", CHI 2017, May 6-11, 2017, 5 pages (Year: 2017).*

(Continued)

*Primary Examiner* — James D Nigh
(74) *Attorney, Agent, or Firm* — GRAESER ASSOCIATES INTERNATIONAL INC; Dvorah Graeser

(57) ABSTRACT

A system and method to permit brand owners to maintain control over their valuable brands in a virtual economy. The system and method feature a mark to permit legitimate branded items to be identified. Optionally and preferably, the system and method also enable non-legitimate, "fake" or fraudulent branded items to be identified. Such branded items include but are not limited to, any type of trademark, including without limitation any type of word mark, color, logo, slogan or any other suitable type of trademark; any object designed by or associated with the brand; and any item featuring any component or material that is trademarked, patented or copyrighted.

21 Claims, 13 Drawing Sheets

(56) References Cited

U.S. PATENT DOCUMENTS

| | | |
|---|---|---|
| 2016/0134593 A1 | 5/2016 | Gvili |
| 2016/0260171 A1 | 9/2016 | Ford |
| 2016/0300234 A1 | 10/2016 | Moss-Pultz |
| 2018/0040040 A1 | 2/2018 | Barski |
| 2019/0102782 A1 | 4/2019 | Diehl |
| 2019/0130701 A1* | 5/2019 | Simons .............. G07F 17/3288 |
| 2021/0201336 A1 | 7/2021 | Mallett |

FOREIGN PATENT DOCUMENTS

| | | | |
|---|---|---|---|
| EP | 3709247 A1 * | 9/2020 | ............. G06Q 20/02 |
| WO | 2006111204 A2 | 10/2006 | |
| WO | 2015168889 A1 | 11/2015 | |

OTHER PUBLICATIONS

Doyle et al., Brands on the Silver Screen, the television screen and the computer screen, 31 pages, Advanced Seminar on Trademark Law 2010, May 3, 2010 (Year: 2010).

* cited by examiner

SYSTEM AND METHOD FOR IDENTIFYING VIRTUAL GOODS

FIELD OF THE INVENTION

The present invention, in at least some aspects, is of a system and method for identifying virtual goods, and in particular, for such a system and method for identifying such virtual goods through a mark.

BACKGROUND OF THE INVENTION

Virtual goods are becoming an important part of the "real" (non-virtual) economy. It is widely known that many video games enable in-game purchases, which in turn provide a valuable revenue stream for their publishers. Objects that belong to established brands or that feature the trademarks of established brands are also being displayed in video games. Virtual worlds are also becoming increasingly popular, again featuring such objects or trademarks. Brand owners clearly wish to maintain control over their valuable brands, including with regard to their trademarks and copyrights. However no good solution currently exists to permit such control in the virtual economy.

BRIEF SUMMARY OF THE INVENTION

The background art does not teach or suggest a system or method to permit brand owners to maintain control over their valuable brands. The background art also does not teach or suggest a system or method to permit brand owners to maintain control over their valuable trademarks and copyrights.

The present invention, in at least some aspects, is of a system and method for identifying, certifying, tracking, protecting, and valuing virtual goods and in particular, for such a system and method for identifying such virtual goods through a mark.

In at least some embodiments, the present invention provides a system and method to permit brand owners to maintain control over their valuable brands in a virtual economy. The system and method feature a mark to permit legitimate branded items to be identified. Optionally and preferably, the system and method also enable non-legitimate, "fake" or fraudulent branded items to be identified. Such branded items include but are not limited to, any type of trademark, including without limitation any type of word mark, color, logo, slogan or any other suitable type of trademark; any object designed by or associated with the brand; and any item featuring any component or material that is trademarked, patented or copyrighted.

Optionally, the branded items are identified with a mark. The mark is preferably associated with information stored in a storage. The mark and/or related information thereto may be retrieved from the storage, for example to determine whether a branded item is legitimate. Optionally the storage comprises a database. Alternatively and/or additionally, the storage comprises a blockchain implemented storage. Also optionally, transactions related to the branded item are recorded in the storage, including but not limited to creation of the item, association with the mark, transfer of the item through sale, licensing and the like, and legitimate use of the branded item.

The virtual world may optionally comprise any type of virtual economy, including but not limited to a video game, a virtual world, a simulation and the like. The virtual economy may optionally be implemented through VR (virtual reality), AR (augmented reality) and the like. The information may optionally be stored on a blockchain for security and non-falsifiability, for example to confirm that the virtual good is authentic.

Any suitable blockchain which involves a distributed ledger, which preferably requires some type of cryptography, more preferably a public/private key encryption system, or hash or digital signatures, may optionally be used. Once a change—such as acceptance of a sale of a virtual good—is made and is written to the distributed ledger, this change is automatically securely, non-falsifiably, that is completely accurately, replicated to all network participants.

The nature of the distributed ledger is such that all parties to a transaction can see the details of the transaction and optionally further requirements for the transaction to be complete.

Such a distributed ledger would also have the advantage of fraud prevention with immutable, append-only Distributed Ledger Technology. For example, users attempting to fraudulently trade cryptocurrency units that they do not possess would be blocked.

A blockchain or blockchain is a distributed database that maintains a list of data records, the security of which is enhanced by the distributed nature of the blockchain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. One well-known application of a blockchain is the public ledger of transactions for cryptocurrencies such as used in bitcoin. The data records recorded in the blockchain are enforced cryptographically and stored on the nodes of the blockchain.

A blockchain provides numerous advantages over traditional databases. A large number of nodes of a blockchain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the blockchain that creates a transaction can determine within a level of certainty whether the transaction can take place and become final by confirming that no conflicting transactions (i.e., the same currency unit has not already been spent) confirmed by the blockchain elsewhere.

The blockchain typically has two primary types of records. The first type is the transaction type, which consists of the actual data stored in the blockchain. The second type is the block type, which are records that confirm when and in what sequence certain transactions became recorded as part of the blockchain. Transactions are created by participants using the blockchain in its normal course of business, for example, when someone sends cryptocurrency to another person), and blocks are created by users known as "miners" who use specialized software/equipment to create blocks. Users of the blockchain create transactions that are passed around to various nodes of the blockchain. A "valid" transaction is one that can be validated based on a set of rules that are defined by the particular system implementing the blockchain. For example, in the case of cryptocurrencies, a valid transaction is one that is digitally signed, spent from a valid digital wallet and, in some cases, that meets other criteria. In some blockchain systems, miners are incentivized to create blocks by a rewards structure that offers a pre-defined per-block reward and/or fees offered within the transactions validated themselves. Thus, when a miner successfully validates a transaction on the blockchain, the miner may receive rewards and/or fees as an incentive to continue creating new blocks.

Preferably the blockchain(s) that is/are implemented are capable of running code, to facilitate the use of smart contracts. Smart contracts are computer processes that facilitate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, buying or selling goods, whether or virtual or physical, executing transfers of goods or of rights associated with such goods, and the like.

Smart contracts may also be described as pre-written logic (computer code), stored and replicated on a distributed storage platform (e.g. a blockchain), executed/run by a network of computers (which may be the same ones running the blockchain), which can result in ledger updates (transfer of digital rights, etc.).

Smart contract infrastructure can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators.

Not all blockchains can execute all types of smart contracts. For example, Bitcoin cannot currently execute smart contracts. Sidechains, i.e. blockchains connected to Bitcoin's main blockchain could enable smart contract functionality: by having different blockchains running in parallel to Bitcoin, with an ability to jump value between Bitcoin's main chain and the side chains, side chains could be used to execute logic. Smart contracts that are supported by sidechains are contemplated as being included within the blockchain enabled smart contracts that are described below.

For all of these examples, security for the blockchain may optionally and preferably be provided through cryptography, such as public/private key, hash function or digital signature, as is known in the art.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

For example, any instruction or function as described herein could be described as being executed according to an instruction selected from a predefined native instruction set of codes, wherein the machine codes are stored on the memory associated with a computational device performing such an instruction, and executed by the computational device's processor. Any instruction or function as described herein may be associated with a computational device and hence to be executed by that device's processor.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings.

DESCRIPTION OF AT LEAST SOME EMBODIMENTS

Figure 1A:
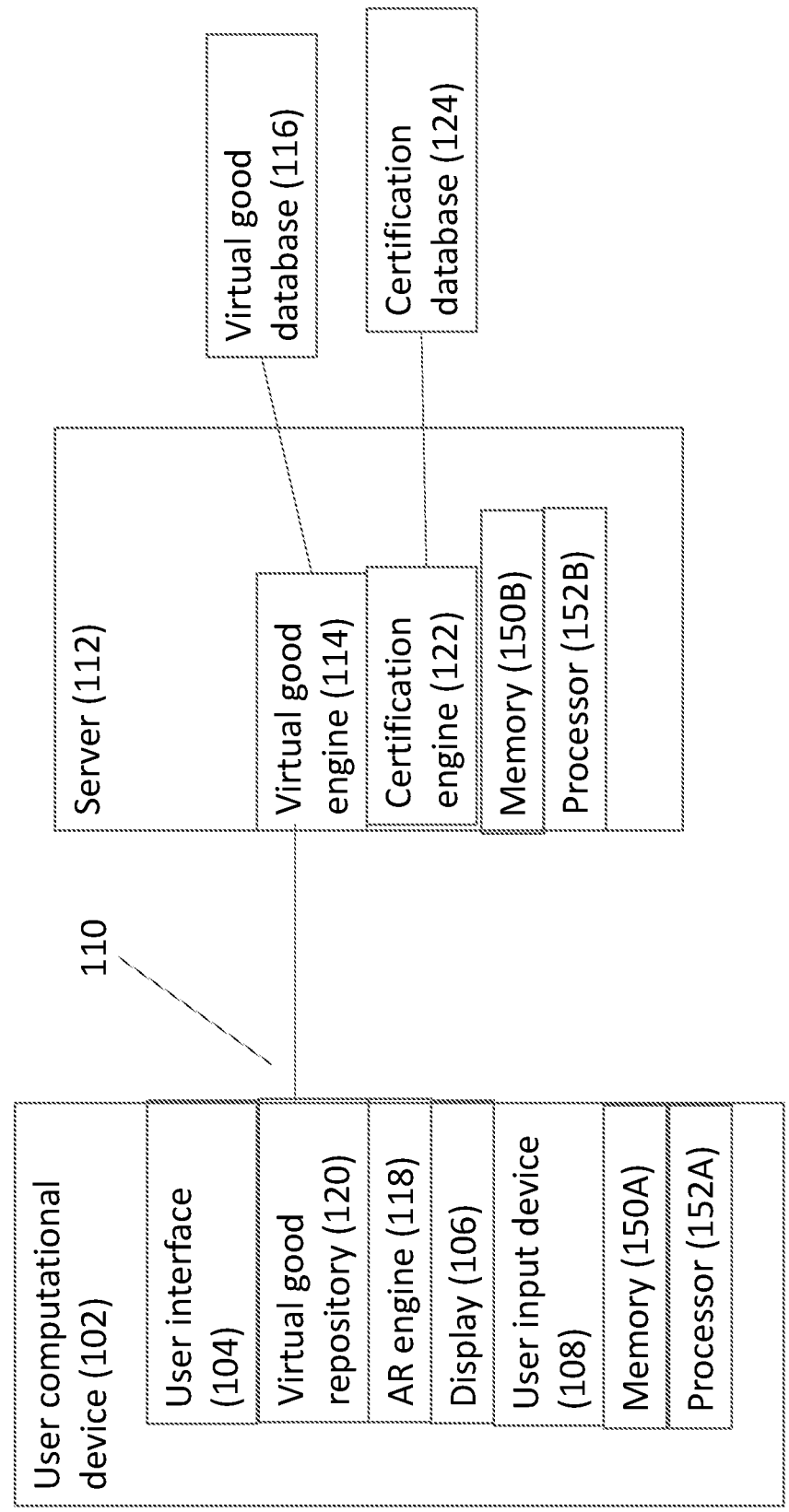
FIGS. 1A-1C show non-limiting, exemplary systems according to at least some embodiments of the present invention.

Authenticated virtual goods may optionally be provided through a certification system for virtual products to carry the value of their physical counterparts, optionally by using blockchain technology. As a non-limiting example, such virtual goods may be those displayed in an AR (augmented reality) or VR (virtual reality) environment. For the sake of discussion only and without intending to be limited in any way, the use of such a mark is described herein with regard to an AR environment.

For visual reference to certify this authenticity, a visual mark can be used. Optionally the mark is visible to a user part or all of the time. Optionally, such a mark is readable by a computer system. If the mark is computer readable, optionally and alternatively, the mark remains not visible to the user, part or all of the time. Without wishing to be limited in any way, optionally the mark may be termed an AMR (authenticated mixed reality) mark. The AMR preferably supports non-copyability for items to retain value and proof of ownership to allow for buying and selling of such virtual items.

The mark may be displayed continuously or periodically. If displayed periodically, optionally the mark is displayed upon request, for example when purchasing a virtual good, transferring a virtual good, for verification upon use of a virtual good within a virtual world, and so forth. The request may be made by the owner, another user, a brand owner, an operator of a virtual world, and so forth.

The certification enables virtual goods to be determined as actually belonging to that brand. A visible mark may give assurance to the user. A computer readable mark enables such assurance to extend to a review of the certification that is external to a particular device, further increasing the assurance that a particular virtual good is related to the specific brand.

Because virtual products are made using different skill sets than their physical counterparts, brand quality and messaging play an oversized role in retaining value between mediums. For luxury and parody products that rely on branding for added value, a virtual version of that product needs authorization from that brand to carry that value. A visual mark gives top level assurance while back-end blockchain code can present un-copyable assurance of its origin while at the same time tracking its usage in the virtual world even when that object is being used outside of virtual spaces controlled by the brand itself.

For instance, when experiencing an augmented or virtual version of a branded object at a virtual property controlled by that brand, such as a website or app, one is guaranteed to be using that brand's authorized virtual version. But if that virtual object is being used in a role playing VR game or an AR advertisement, other parties will be involved that can't guarantee authenticity.

This problem of authentication and certification will be particularly acute in the future, as users purchase virtual objects with real world (non-virtual) money. Such virtual products will carry more and more real value. For brands with brand value on physical objects to carry over into these virtual worlds, they need this kind of authentication. The added benefit of using blockchain for authentication is also that its use becomes trackable and therefore monetizable.

Regardless of where a virtual object goes, the original creator will be compensated for its use with no central authority or trust required. With the trust of authenticity built right into the virtual object, the digital world solves the problem of unauthorized copying.

Examples today include video games like racing car games that use multiple-brand racecars. These deals currently take months of negotiations and teams of lawyers. As augmented and virtual realities become more popular, these scenarios and deals will become much more frequent. With a mark as described herein, preferably through a blockchain implementation as described herein, these deals can be negotiated without a need for a central authority and enjoy the benefit of an industry accepted set of rules.

Furthermore, such a marking system, which optionally supports automatic transactions between a first party wishing to license a virtual good or brand owned by another party, would further support micro or smaller transactions. A creative commons license could therefore optionally include such a small transaction, rather than being free, for example. In addition, such a system would prevent unauthorized representations of branded or copyrighted works, including abusive representations.

Optionally, the virtual good is a virtual representation of an actual good, such as a luxury good for example. The virtual good may also relate to existing products that create augmented extensions of their products (floating accessories above watch faces, making virtual designs on branded products, for example by using brand symbol as the way for the camera to know to unlock the virtual extension).

As described in greater detail below, optionally the AMR may support the existence and/or transfer of virtual products across platforms. For example a character or a virtual good in World Of Warcraft can now live in Fortnight or Minecraft. Such a transfer or multi-platform existence can also be controlled by the brands the video games use on their platforms, and/or customized by the user.

Another non-limiting example would be to control the use of brands, brand marks and branded items, whether based upon a real world physical object, within an AR or VR experience, and/or a virtual world. For example, the AMR may be used to prevent the unauthorized use of a brand name, logo, image, appearance and the like. For example, a user may be tempted to put homemade virtual versions of objects into stories. The AMR may be used to control such unauthorized instead, so that the user instead pays for the license from the original creator. An AMR mark (which may be visible only when needing proof so as not to interrupt the flow of the experience) would show that it was legally an authorized use of the virtual good, brand, brand appearance, brand marks, branded items and the like.

If an artist creates a new work of virtual art, that is to say, art for a virtual world, and/or for an AR or VR experience, the AMR may be used to mark this work of virtual art to permit control by the artist. The AMR may then be connected to a blockchain entry, to permit transfer of the work of art.

Turning now to the drawings, there is shown in FIG. 1A an exemplary non-limiting system for providing and examining virtual good certifications, according to at least some embodiments of the present invention. A system 100 features a user computational device 102 in communication with the server 112 through a computer network 110, such as the internet for example. User computational device 102 operates a user interface 104, which enables the user to interact with an AR engine 118 and a virtual good repository 120.

As used herein, a "user interface" 104 generally includes a plurality of interface devices and/or software that allow a customer to input commands and data to direct the processing device to execute instructions. For example, the user interface may include a graphical user interface (GUI) or an interface to input computer-executable instructions that direct the processor to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other customer input/output device for communicating with one or more users.

Information is displayed to the user through a display 106, which may optionally be a touch screen for example, in which case display 106 is optionally combined with a user input device 108. User input device may also additional and alternatively comprise one or more further input devices, including but not limited to a keyboard, a mouse, or other pointing device, and the like.

The user is preferably able to interact with the virtual goods, which are displayed by AR engine 118. The virtual goods are preferably stored in virtual good repository 120, which may optionally also feature wrapper software, for example, to assist in determination of the authentication of certain goods and also to optionally cause a visual mark to be displayed if a virtual good is in fact certified.

Server 112 operates a virtual good engine 114 and a certification engine 122. Virtual good engine 114 is in communication with a virtual good database 116. Virtual good engine 114 takes information from virtual good database 116 and may optionally transmit it to virtual good repository 120. For example, such a transmission may optionally be performed when a virtual good is purchased to be stored in virtual good repository 120.

When a virtual good is to be certified, optionally a certification is invoked through user interface 104 or alternatively, by one or both of AR engine 118 and virtual good repository 120. Next, a request for authentication is preferably sent to virtual good engine 114, which may optionally retrieve an identifier of information from virtual good database 116.

Certification engine 122 then performs certification with regard to a certification database 124, for example, by determining whether the virtual good identifier in question has actually been certified, and/or otherwise determining whether or not the virtual good has been certified. Optionally, virtual good repository 120 or AR engine 118 are in direct contact with certification engine 122 in order to perform the certification process.

Optionally, AR engine 118 and/or virtual good repository 120 may only enable a virtual good to be shown, displayed, interacted with or otherwise provided to the user through user computational device 102 after certification has been performed through certification engine 122, and certification has been verified.

User computational device 102 also preferably features a memory 150A and a processor 152A. As used herein, a processor generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Processor 152A is configured to read codes from memory 150A, in order to perform the various functions of user computational device 102 as described herein. Through reading such codes, processor 152A is configured to perform a defined set of operations in response to receiving a corresponding instruction selected from a predefined native instruction set of codes. These codes comprise: a first set of machine codes selected from the native instruction set for receiving an input request through user input device 108 or as an automatic request from AR engine 118 or user interface 104, for verification of a virtual good, for example in regard to whether the good is fraudulent or "fake", or alternatively has been authenticated. A second set of machine codes is selected from the native instruction set for analyzing the request and for reviewing information to determine whether the virtual good has been authenticated, for example according to information provided by server 112, for example through certification engine 122. A third set of machine codes selected from the native instruction set enables the virtual good to be accessed through user computational device 102, for example for use in a virtual world, once the virtual good has been authenticated. Each of the first, second and third sets of machine code is stored in the memory 150A.

Server 112 also preferably features a memory 150B and a processor 152B. Processor 152B is configured to read codes from memory 150B, in order to perform the various functions of user computational device 102 as described herein. Through reading such codes, processor 152B is configured to perform a defined set of operations in response to receiving a corresponding instruction selected from a predefined native instruction set of codes. These codes comprise: a first set of machine codes selected from the native instruction set for receiving a request for verification of a virtual good, for example in regard to whether the good is fraudulent or "fake", or alternatively has been authenticated. Such a request may be received through user computational device 102 as previously described, or from a different computational device (not shown), such as that of a virtual world operating server for example.

A second set of machine codes is selected from the native instruction set for analyzing the request and for reviewing information to determine whether the virtual good has been authenticated, for example according to information provided by certification engine 122, reading data from certification database 124. A third set of machine codes selected from the native instruction set enables the virtual good to be accessed through user computational device 102, for example for use in a virtual world, once the virtual good has been authenticated, or for changes in ownership and other information to be recorded in a virtual good database 116. Each of the first, second and third sets of machine code is stored in the memory 150B.

Figure 1B:
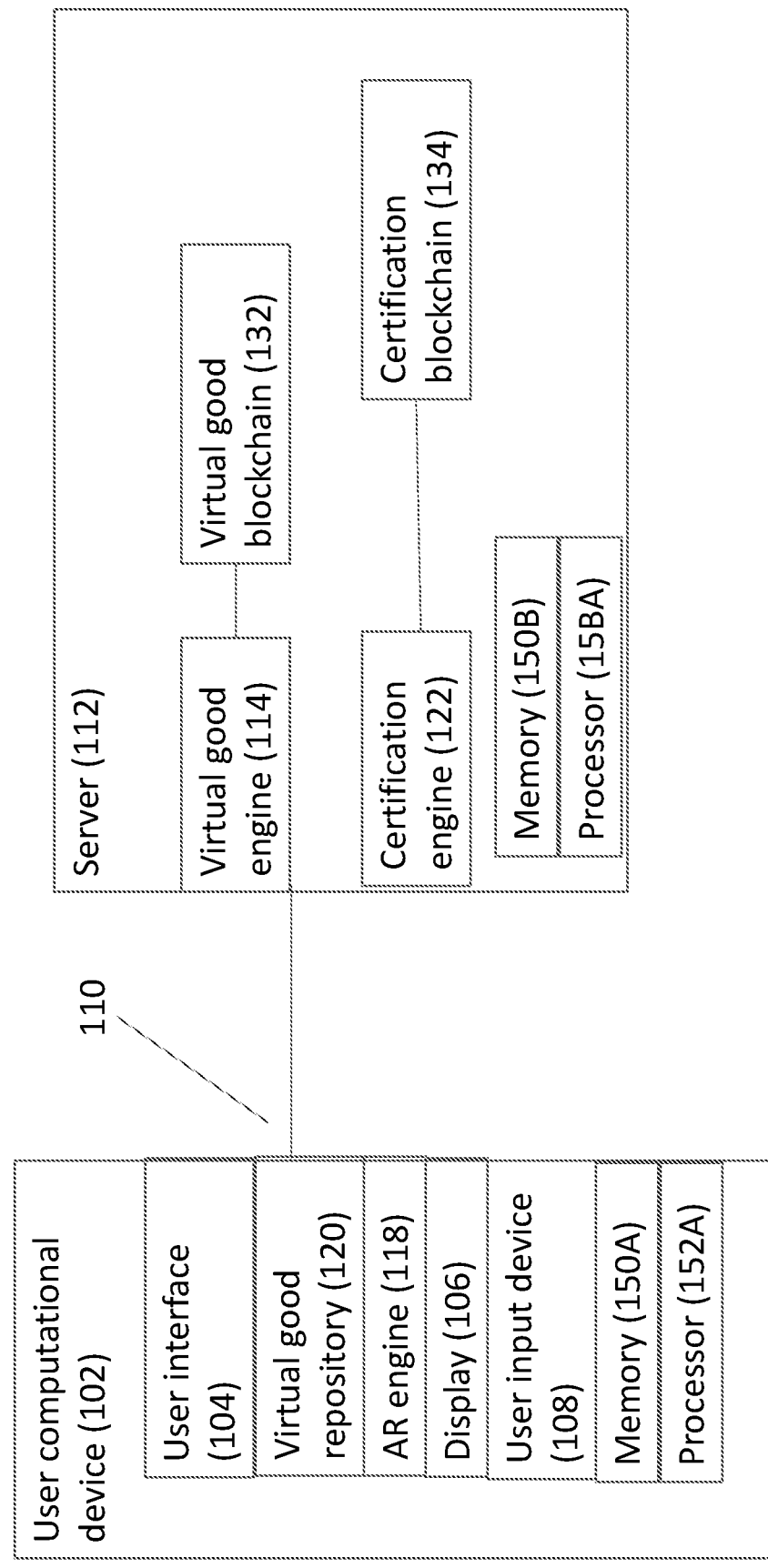

FIG. 1B shows another exemplary non-limiting implementation of a system for certifying virtual goods, according to a least some embodiments of the present invention. As shown in a system 130, again, user computational device and server 112 are present, as is computational network 110. Reference components having the same numbers have the same or similar function.

In this case, user computational voice 102, again, operates the previously described components, softwares, and devices. However, in this case, rather than a virtual good database, virtual good engine 114 is in connection to a virtual good blockchain 132. Data is written to and read from virtual good blockchain 132, which provides a record of all the transactions involved from the virtual good. These details include, for example, how it was manufactured, who manufactured it, how much it cost, who purchased it originally, and optionally, any other further buyers and sellers along the chain.

Data is stored and managed using blockchain technology. Optionally, the blockchain can run code. As is known in the art, blockchains can perform more complex operations, defined in full-fledged programming languages. However, it is not a requirement for the blockchain to run code in order for the present invention to be implemented. Optionally only a distributed ledger is required, in which information is written that is securely available to all parties through cryptographic access to the distributed ledger.

According to at least some embodiments the blockchain is optionally a public or permissionless blockchain, such as Bitcoin or Ethereum, which is decentralized and which is a blockchain that anyone in the world can read, anyone in the world can send transactions to and expect to see them included if they are valid, and anyone in the world can participate in the consensus process for determining what blocks get added to the chain and what the current state is. As a substitute for centralized or quasi-centralized trust, public or permissionless blockchains are secured by cryptoeconomics—the combination of economic incentives and cryptographic verification using mechanisms such as proof of work or proof of stake.

Alternatively and optionally, the blockchain is a consortium blockchain, such as Hyperledger, where the consensus process is controlled by a pre-selected set of nodes, which for example may optionally be provided or supported by financial institutions and/or by an international consortium of conservation and development organizations. Such a blockchain is partially decentralized.

Optionally, the Hyperledger Fabric blockchain framework implementation is used (details are provided in "Architecture of the Hyperledger Blockchain Fabric" by Christian Cachin, IBM Research—Zurich, July 2016). It is one of the Hyperledger projects hosted by The Linux Foundation. Intended as a foundation for developing applications or solutions with a modular architecture, Hyperledger Fabric allows components, such as consensus and membership services, to be plug-and-play. Hyperledger Fabric leverages container technology to host smart contracts called "chaincode" that comprise the application logic of the system. This framework also includes such features as:

Channels for sharing confidential information
Ordering Service delivers transactions consistently to peers in the network
Endorsement policies for transactions
CouchDB world state supports wide range of queries
Bring-your-own Membership Service Provider (MSP)

If the blockchain is private or permissioned—that is, centrally controlled by an operating entity to authorize participation—then optionally all members of the system as described by the present invention which need access are provided with cryptographic access, and become members of the private or permissioned blockchain system, such as Hyperledger.

Hyperledger has its own set of protocols and consensus process, which may optionally be used with smart contracts, to prevent fraud through providing the same asset (invoice) more than once for financing.

One of ordinary skill in the art could easily select a distributed ledger and implement it within various embodiments of the present invention, for example according to information provided in "Blockchain Basics: Introduction To Business Ledgers" by Brakeville and Perepa, IBM, May 9, 2016.

For all of these examples, security for the blockchain may optionally and preferably be provided through cryptography, such as public/private key, hash function or digital signature, as is known in the art.

Similarly, certification engine 122 is preferably in communication with the certification blockchain 134 for determining certification. The process of determining certification may optionally be similar to that as described in FIG. 1A, except that instead of a database, information is read from and written to a blockchain.

As previously described, processor 152B may read codes from memory 150B, to enable processor 152B to cause information to be read from, or written to, virtual good blockchain 132 or certification blockchain 134.

Figure 1C:
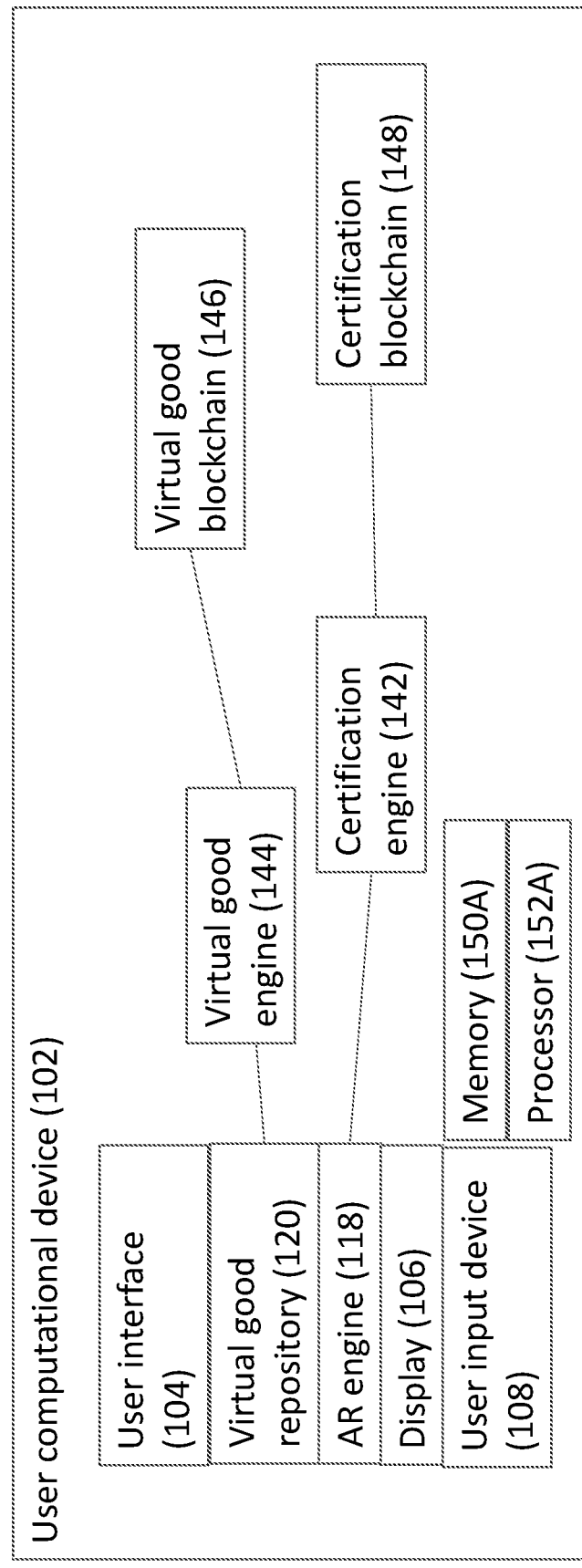

FIG. 1C shows another exemplary non-limiting illustrative system for certifying virtual goods. In this non-limiting example, all activities are performed on or through user computational device 102. In a system 140, user computational device 102 again comprises user interface 104, virtual good repository 120, AR engine 118, display 106, and user input device 108.

These components preferably have the same or at least similar function to the components as described in FIGS. 1A and 1B. However, in this case virtual good engine 144 is preferably operated by user computational device 102, and access to the blockchain, in this case a virtual good blockchain 146, is provided through user computational device 102. It should be noted that it is the nature of the blockchain that, in fact, multiple copies are stored at all nodes, so in this non-limiting example, user computational device 102 would be such a node.

Certification engine 142 is in communication with a certification blockchain 148, again, acting as a node for that particular blockchain. Otherwise, the method of certification is preferably similar to that described in FIGS. 1A and 1B, except that in this case, all activities take place on or through user computational device 102.

As previously described, processor 152A may read codes from memory 150A, to enable processor 152A to cause information to be read from, or written to, virtual good blockchain 146 or certification blockchain 148.

Figure 2A:
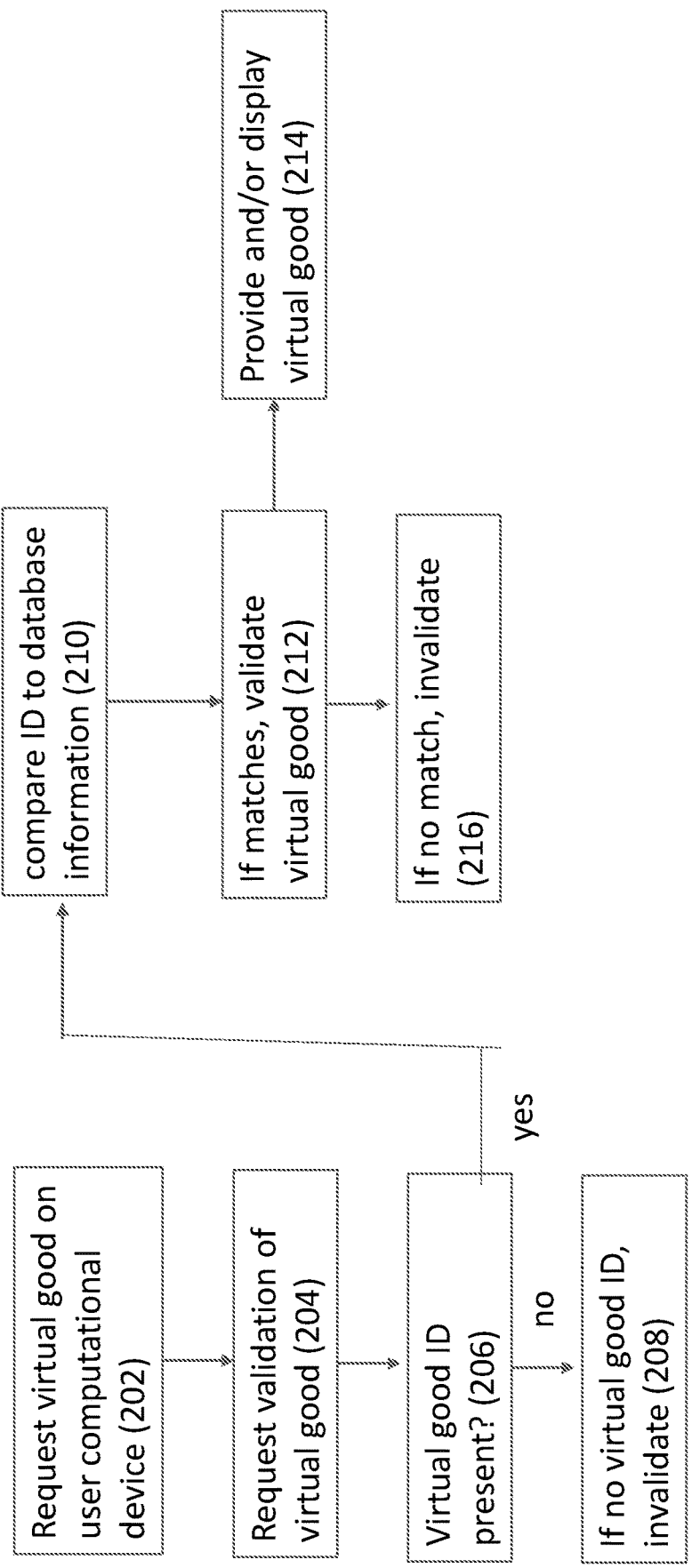
FIGS. 2A and 2B show non-limiting, exemplary methods according to at least some embodiments of the present invention.

FIG. 2A shows a non-limiting exemplary method for determining certification of a virtual good according to at least some embodiments of the present invention. As shown in a process 200 for certification, the process begins when a virtual good is requested on the user computational device 202. Such requests may optionally occur when the user wishes to display or interact with such a virtual good, and/or upon purchase and/or upon any requirement or request for a certification.

Next, validation of the virtual good is requested in stage 204. Such validation requests may optionally be performed through the user computational device, but alternatively are performed through information being provided to a server as previously described. It is then determined whether the virtual good ID is present in stage 206. The virtual good ID is preferably associated with the virtual good. It may optionally be provided through additional code, through information that links the virtual good to some type of identifier, or some other information provided through the user computational device.

If no virtual good ID is provided, then the virtual good is preferably invalidated in stage 208. However, if the virtual good ID is present, then preferably in stage 210 the ID that is established for the virtual good, as stored on the user computational device, is preferably compared to database information in stage 210. If the ID associated with the virtual good on the user computational device and the database information match, as shown in stage 212, then the virtual good is validated and it is possible then to provide and/or display the virtual good in stage 214. If, on the other hand, there is no match, then the virtual good is invalidated, and preferably, it cannot be provided and/or displayed and/or bought or sold.

Figure 2B:
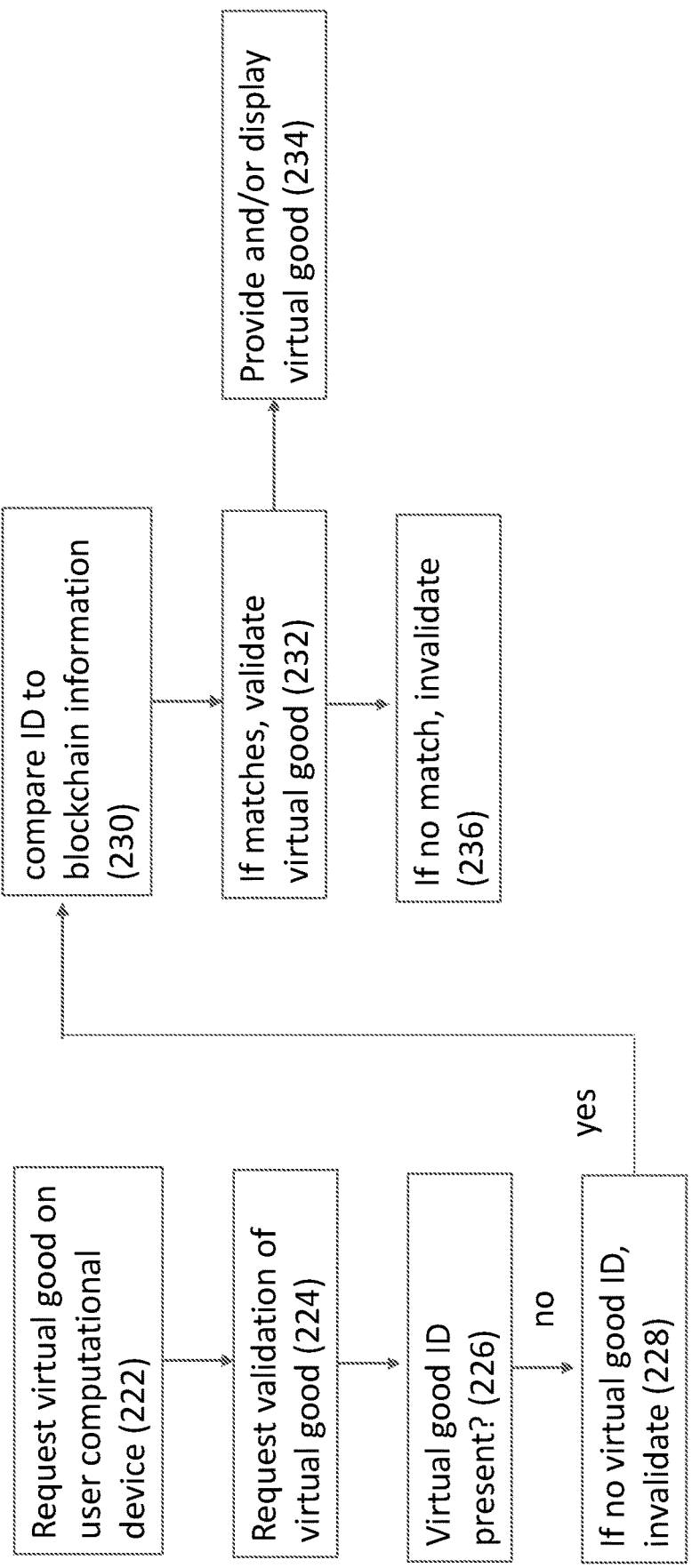

Turning now to FIG. 2B, there is shown another non-limiting exemplary method for authentication, given as a method 220. In this case, involving a blockchain, stages 222 to 228 are similar or identical to stages 202 to 208 of FIG. 2A. However, in stage 230, the virtual good ID is compared to blockchain information rather than to database information. The remainder of the process is otherwise similar, if not identical to that of FIG. 2A.

Figure 3A:
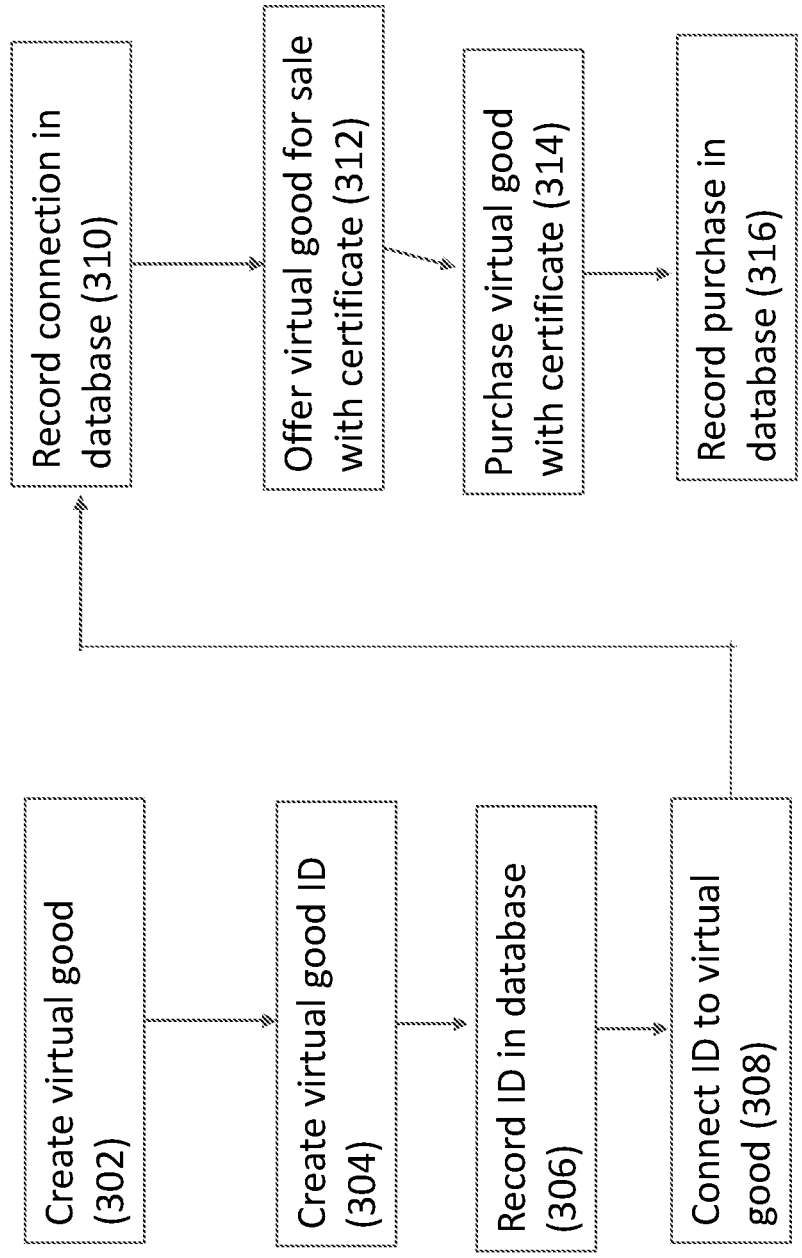
FIGS. 3A and 3B show non-limiting, exemplary methods for identifier creation and recording according to at least some embodiments of the present invention.

FIG. 3A shows a non-limiting exemplary method for creating a virtual good and then offering it for sale. As shown in a process 300, the method begins with creating a virtual good in stage 302. Next, the virtual good ID is created in stage 304. The ID is recorded in the database in stage 306. This allows the identifier to be associated with the virtual good for future tracking.

The identifier is then connected to the virtual good in stage 308, if this was not previously performed in stages 304 and 306. The connection is then recorded in the database 310. The separation of the virtual ID creation, and then connection to the virtual good, followed by recordation, may optionally be used for example in cases where a limited edition of certain virtual goods is to be made, and/or where a virtual good is to be customized, but is still to be limited in quantity and/or is to be otherwise marked in a limited manner.

Alternatively, the virtual good could be created with the virtual good ID, and both could then be connected and recorded simultaneously by them being in separate steps. The virtual good is then offered for sale with a certificate in stage 312. The certificate then certifies a test to the authenticity of the virtual good. The user may then optionally purchase the virtual good with certificate in stage 314, for example through the previously described user computational device, and the purchase is preferably recorded in the database in stage 316. Optionally, method 300 may be performed with any of these systems of FIGS. 1A to 1C.

Figure 3B:
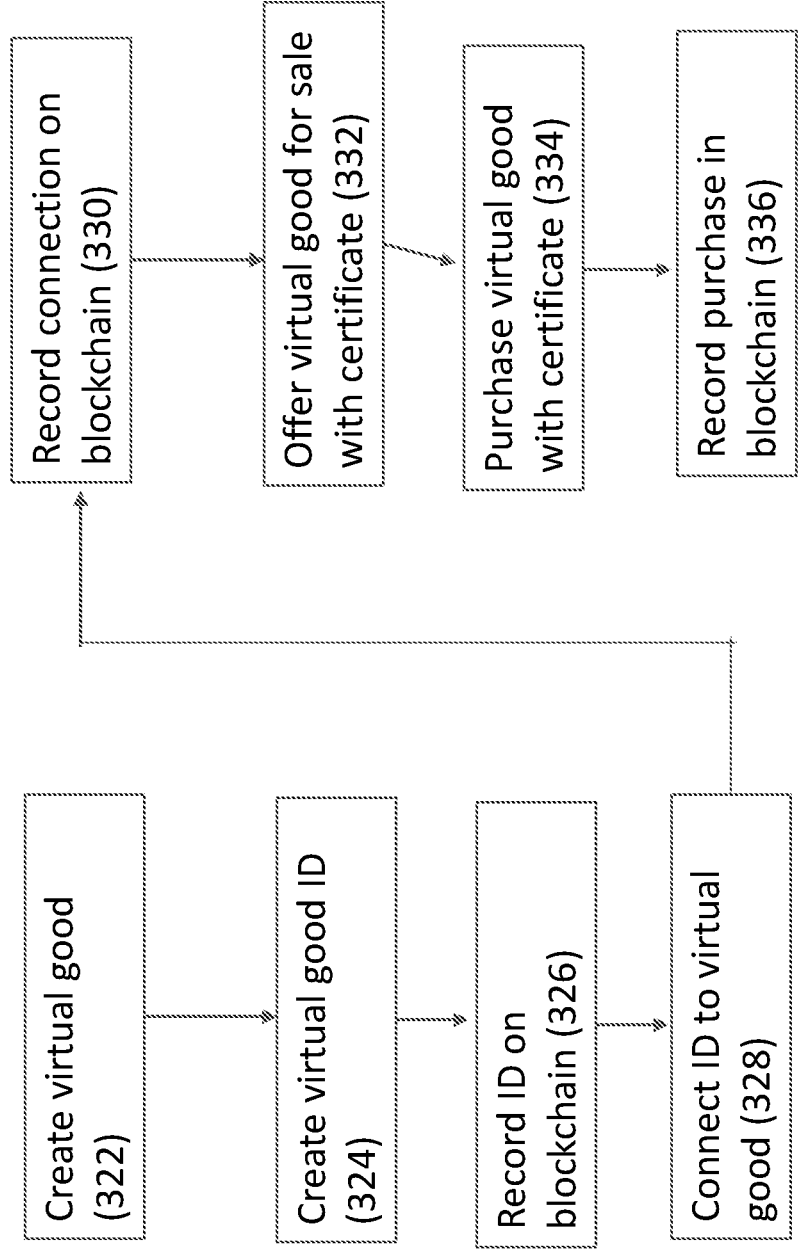

FIG. 3B shows a process 320. As shown again, the virtual good is created in stage 322, as is the virtual good ID in stage 324. In this case, however, the virtual good ID is recorded on the blockchain in stage 326.

As previously described, the blockchain is effectively copied throughout the various nodes which hold it. For this reason, the blockchain is non-falsifiable. The fact that the ID has been recorded means that it will be connected to the virtual good as a permanent record.

Optionally, the ID is connected to the virtual good in stage 328. Also optionally, stages 326 and 328 are performed in reverse order. The connection is recorded on the blockchain in stage 330, although alternatively this connection may be performed earlier.

The virtual good is then offered for sale with a certificate in stage 332, which is connected to the blockchain. After the virtual good has been purchased in stage 334, the purchase is recorded in the blockchain stage 336, again providing a permanent record.

Figure 4A:
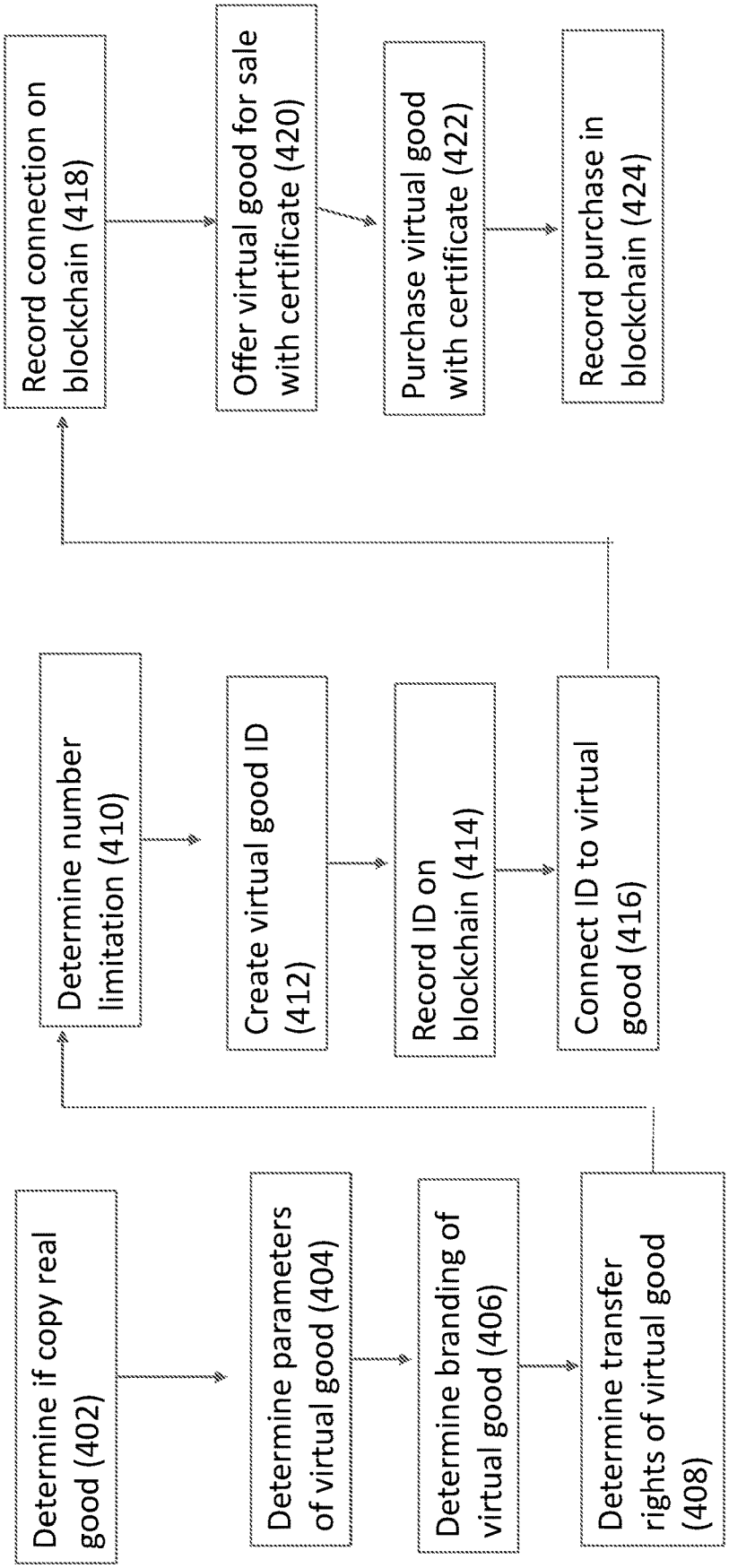
FIG. 4A, there is shown a non-limiting exemplary method for determining how to create a mark for a virtual good and the virtual good itself.

Turning now to FIG. 4A, there is shown a non-limiting exemplary method for determining how to create a mark for a virtual good and the virtual good itself. As shown on the flow 400, there is provided a method, which begins by first determining whether the real good should be copied in 402. For example, the virtual good may be created completely from scratch, that is to say without reference to a real physical good that has already been created, or is the virtual good being created on the basis of a copy or virtual facsimile of an actual good.

If it is the former, then the virtual good needs to be designed. If it is the later, then parameters relating to the actual good, the physical good, need to be input in order to be able to create the virtual copy of the physical good.

Next in 404, regardless of whether the virtual good is being created from a copy of a physical good or whether it is being created de novo, that is, from scratch, the parameters of the virtual good need to be determined. These parameters may relate to appearance, how it appears in either augmented reality or virtual reality, when it may be displayed, how it may be used, colors and optionally other limitations, shapes, sizes, so forth.

Next, the branding of the virtual good is determined in 406. By branding, it is meant, will the virtual good have a particular brand name? Will it perhaps relate to a particular line of a particular brand? How is the branding going to affect the appearance of the virtual good?

In 408, the transfer rights of the virtual good are determined. These include whether or not the owner of the virtual good is allowed to sell it to anyone, whether in fact the owner of the virtual good is allowed to sell it at all or whether perhaps the owner of the virtual good must turn it back over to the brand owner for transfer or any other requirements on the transfer rights.

The transfer rights may also relate, as described in greater detail below, to a situation in which the owner of the virtual good wishes to transfer it between different virtual worlds in which the owner may participate.

In 410, it is determined whether they'll be a limitation on the number of copies of the virtual good to be created. For example, this may be a completely custom virtual good. Alternatively, it may be a limited edition, say, with a limited number of copies that could be created. For example, optionally a limited number of copies may be created. As a non-limiting example, perhaps only twenty copies can be created. Perhaps also, in that case, they would need to be numbered to indicate that, for example, this is copy nine out of twenty or any other information relating to the number limitation that is to be made.

Next, the virtual good ID is created in 412 and the ID is recorded on the blockchain in 414. This means that the virtual good ID is recorded so that others may read from the blockchain or write to the blockchain. Of course, this information may be encrypted so that not everyone is allowed access to it, but it provides a permanent record of the virtual good ID.

Next, the virtual good ID is connected to the virtual good in 416 and this connection is recorded on the blockchain. For example, a particular virtual good version may have a certain numbering such as nine out of 20, whatever the limitation is, may also have particular color, image, shape, size, other limitations. All of this information is preferably recorded on the blockchain in 418 so as to connect the virtual good to the virtual good ID.

Next, the virtual good is offered for sale with the certificate in 420. The certificate is one of authenticity and it allows the virtual good to be understood and later on verified as being actually a verified and therefore, authentic virtual good.

The owner then purchases the virtual good with a certificate in 422 and the purchase is recorded in the blockchain in 424.

Figure 4B:
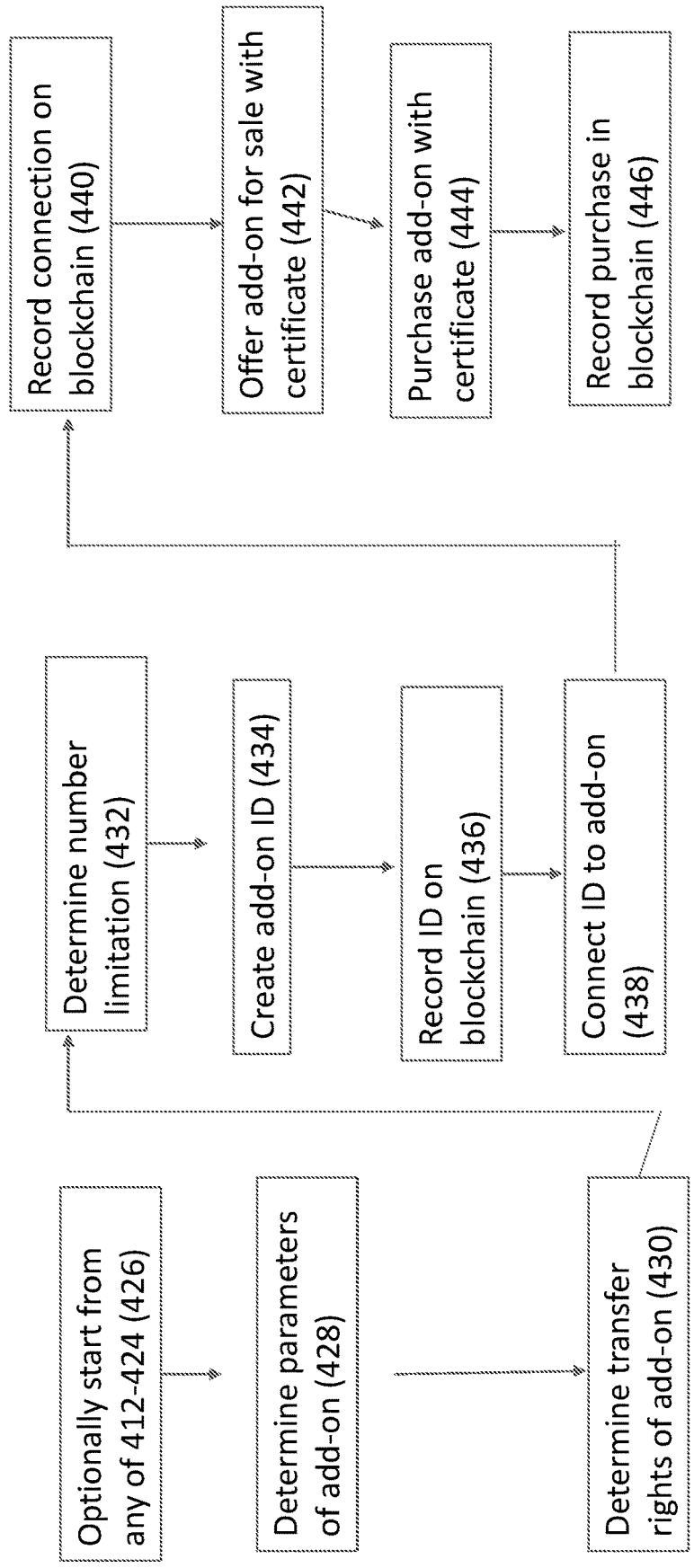
FIG. 4B relates to a non-limiting exemplary method for creating an add-on for a virtual good.

FIG. 4B relates to a non-limiting exemplary method for creating an add-on for a virtual good. As a non-limiting example, a virtual good may be, for example, a watch. The watch may have as an add-on a watch band or a watch face. Whether or not it's permitted to add the watch band or watch face may be determined by such factors as ownership of the virtual good, transfer rights and other items, which are related to the virtual good parameters.

For a method 425, the process starts at any of 412 to 424 from FIG. 4A in 426. Next, the parameters of the add-on are determined in 428, which as previously described, maybe related to such factors as colors, sizes, shapes, styles, whether or not they're numbered, or created in a limited number, and so forth.

Next, the transfer rights of the add-on are determined in 430. For example, is the owner of the add-on allowed to transfer or sell the add-on to anyone, or is transfer or selling only permitted, for example to the owner of another identical or similar virtual good and so forth.

Next, the number of items that may be created is determined in 432 as previously described for the virtual good, and the add-on ID is created in 434. The ID is recorded on the blockchain in 436 and is then connected to the add-on on 438, again, as previously described for the virtual good. The connection is recorded on the blockchain in 440. The add-on may then be offered for sale with the certificate in 442 and an owner may purchase the add-on with the certificate in 444. The purchase is then recorded in the blockchain in 446.

Figure 5:
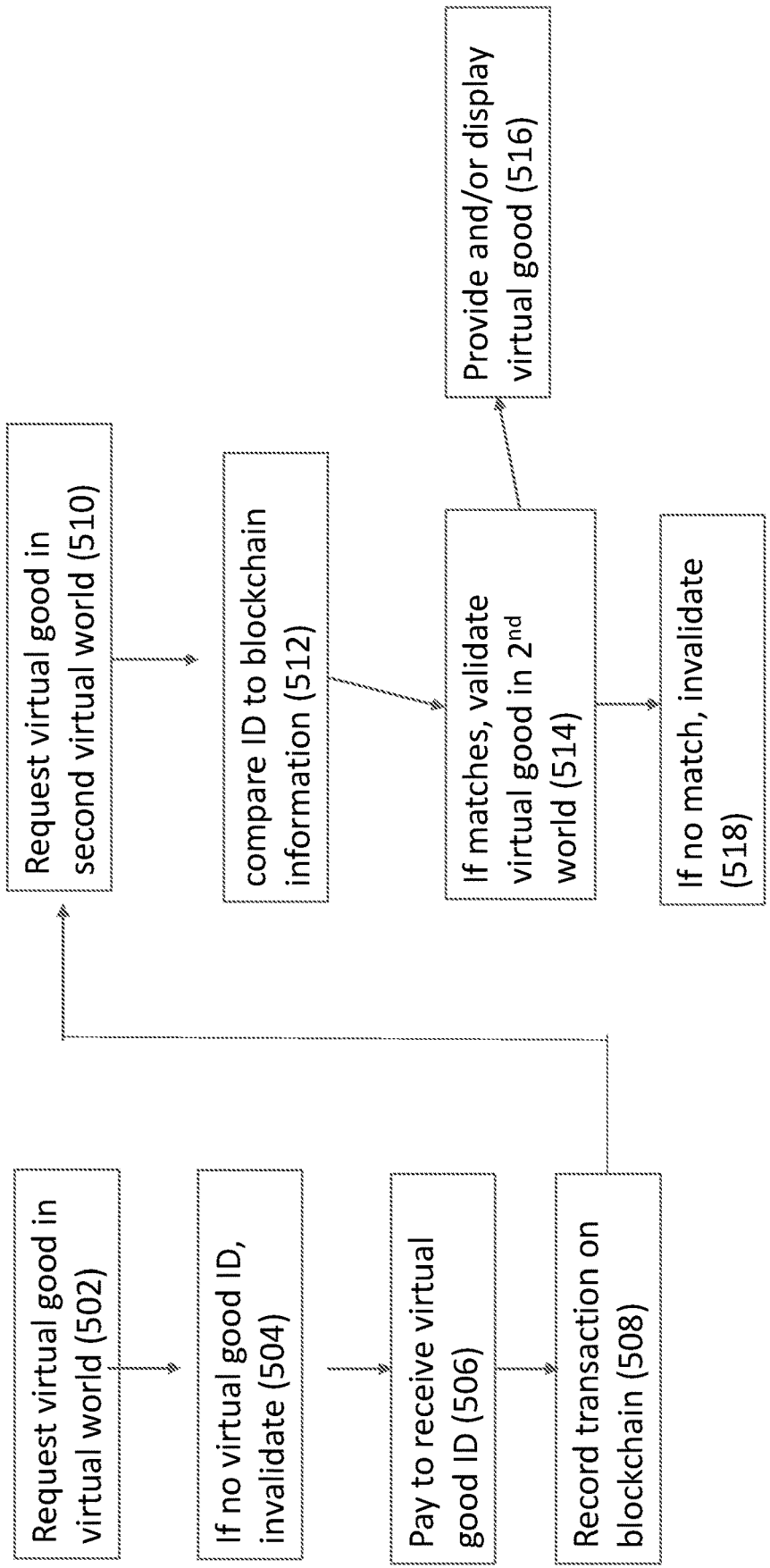
FIG. 5 shows the non-limiting exemplary method for requesting a virtual good in a virtual world and for the matching up to that virtual world.

FIG. 5 shows the non-limiting exemplary method for requesting a virtual good in a virtual world and for the matching up to that virtual world.

As shown in the method 500, in 502, the virtual good is requested in the virtual world. Next, if there is no virtual good ID, it is determined to be invalidated in 504. That is, the virtual good is not a valid virtual good and may not be used further.

In the 506, the owner or owner who wishes to purchase the product pays to receive the virtual good ID and records the transaction on the blockchain in 508.

Next, the owner requests the virtual good for a second virtual world in 510. As previously described, there may be limits on how a transaction is made for people with a virtual good and whether or not the virtual good is transferable. Such limits may also include whether or not the owner may use the virtual good in the second virtual world or not. If this is permitted, then the idea is compared to the blockchain information in 512 and if it matches, then the virtual good is validated in the second virtual world in 514 and the virtual good is provided and/or displayed in 516. Otherwise, if there is no match, the virtual good is invalidated and is not permitted to be displayed in the second virtual world.

Figure 6:
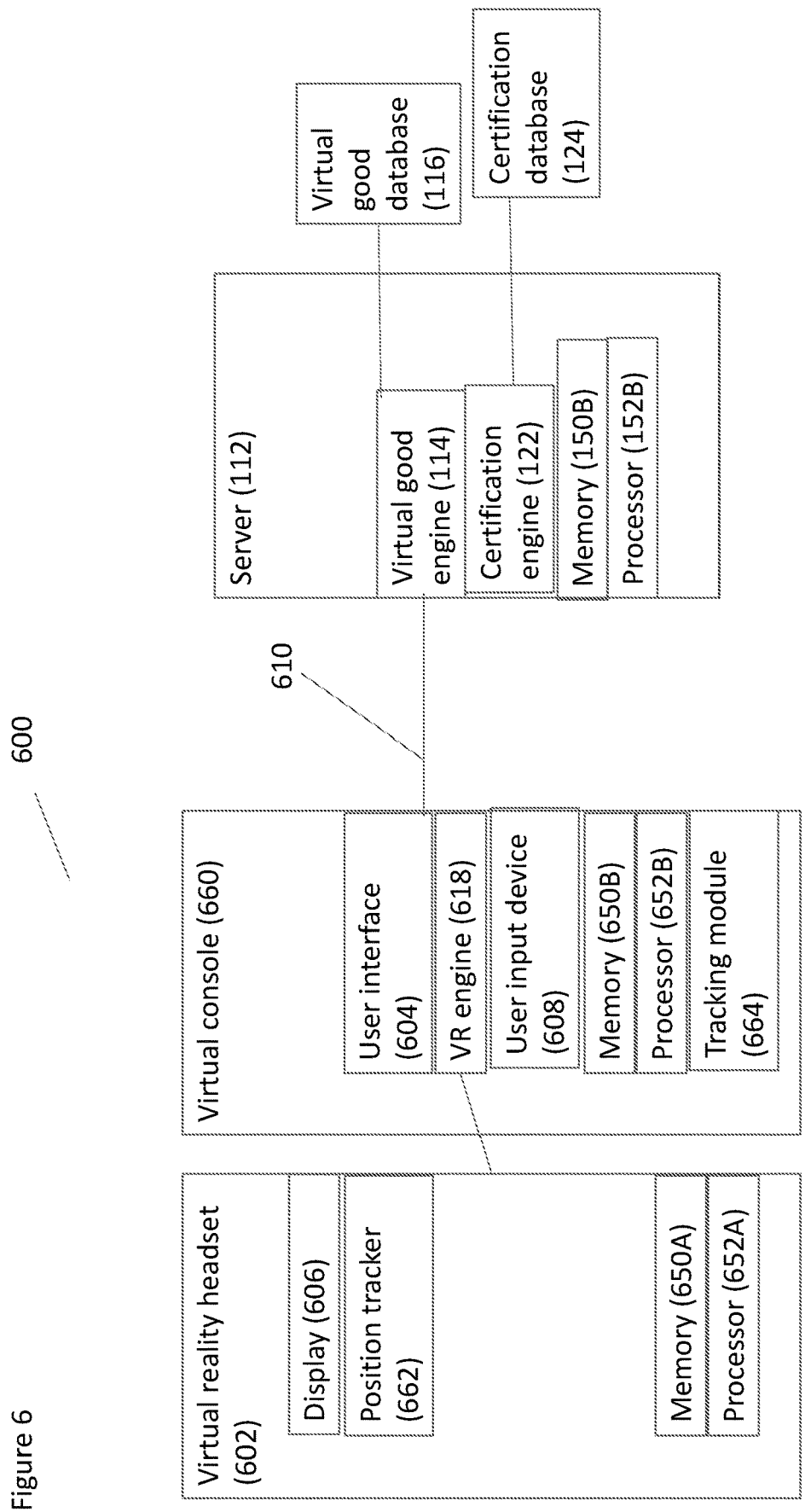
FIG. 6 shows a non-limiting, exemplary system for verification of authenticity and/or ownership of a virtual good for display to a user through a VR (virtual reality) headset.

FIG. 6 shows a non-limiting, exemplary system for verification of authenticity and/or ownership of a virtual good for display to a user through a VR (virtual reality) headset.

In a system 600, a VR headset 602 is operated under the control of a virtual reality console 660. Operation of the console 660, and hence what is displayed on VR headset 602, is determined according to user commands input through a user interface 604 and/or a user input device 608, which may operate substantially as previously described. A VR engine 618 determines what is to be displayed through VR headset 602, and specifically display 606.

A position tracker 662 determines a location of VR headset 602, and hence of the user; this location information is then fed to a tracking module 664, which determines the location information for use in adjusting the VR display through VR headset 602.

Memory 650A and 650B stores code and data for execution of one or more instructions by processor 652A and 652B, respectively.

Virtual console 660 communicates with a server 112 through a computer network 610, such as the internet for example. Virtual console 660 may communicate with server 112 to determine whether a virtual good is valid, for example according to associated certification, and/or brand or mark information. Optionally such certification, brand or mark information is displayed to the user through VR headset 602. In addition, server 112 may indicate when a user is not able to access a particular virtual good, for example for use in a virtual world, due to a lack of authentication, for example through a notification displayed through VR headset 602.

Figure 7:
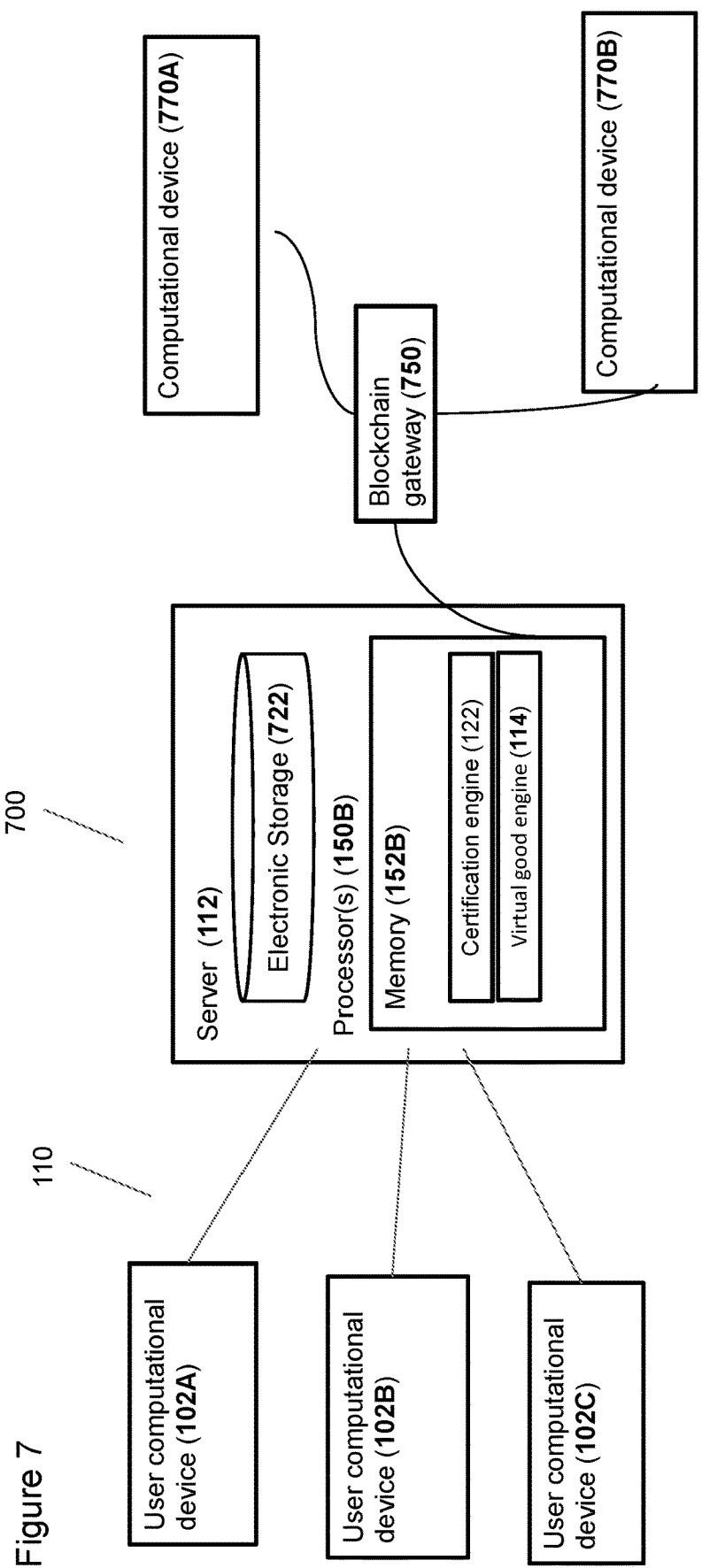
FIG. 7 shows a non-limiting, exemplary system for verification of authenticity and/or ownership of a virtual good across a plurality of computational systems.

FIG. 7 shows a non-limiting, exemplary system for verification of authenticity and/or ownership of a virtual good across a plurality of computational systems. For example, an owner of a virtual good may wish to be able to use such a virtual good across a plurality of computer systems, such as a plurality of virtual worlds, a plurality of online or offline video games, one or more metaverses or spaces within the metaverse, other digital spaces and so forth. A seller of a virtual good, or a licensor which permits the use of a design, logo and the like for a virtual good, may also choose to set one or more parameters according to which such use across a plurality of computer systems is permitted. These parameters are preferably connected to a mark or certificate associated with the virtual good, to determine for example which usage in which computer system(s) is permitted. Optionally the virtual good has both a mark and a certificate. Optionally the mark is visible or may be rendered visible within the computer system. Items with the same reference number as in previous figures have the same or at least similar function.

As shown in a system 700, a plurality of user computational devices 102, of which user computational devices 102A-102C are shown for the purpose of illustration and without any intention of being limiting, are in communication with server 112. In addition, a plurality of computational devices 770, of which computational devices 770A and 770B are shown for the purpose of illustration and without any intention of being limiting, are in communication with server 112. Computational devices 770A and 770B may each be a gateway, server or the like for a computer system, including without limitation a virtual world, online or offline video game, metaverse or space within the metaverse, or other digital space. A user interacts with each such computer system through user computational device 102 which in turn communicates with computational device 770 through server 112.

As previously described, a user may purchase a virtual good, such as any suitable type of digital good, with a certificate indicating its authenticity. Such a virtual good may then be employed in a computer system as described above, through interactions with computational device 770 as mediated by server 112. Server 112 preferably analyzes the certificate to determine authenticity, and/or may also determine whether the user (through user computational device 102) is permitted to use such a digital good, according to certification engine 122 and/or virtual good engine 114. Optionally, server 112 analyzes one or more parameters associated with the certificate to determine whether the particular use of the digital good is permitted.

Recording of ownership transfers and parameters may be performed through a blockchain (not shown), which may be accessed through a blockchain gateway 750. Blockchain gateway 750 may read relevant information from, and write information to, the blockchain. Such information may then be provided to server 112, and/or to a computer system as mediated by computational device 770. Optionally, server 112 and/or computational device 770 may also provide information for being written to the blockchain, through blockchain gateway 750.

Optionally, a user may be able to associate a certificate with a designed digital good that is not provided with the certificate, through communication between user computational device 102 and server 112. Virtual good engine 114 may for example determine whether the designed digital good that is not provided with the certificate meets the requirements of one or more parameters. Certification engine 122 may determine whether such a designed digital good may be loaned or otherwise transferred to another user, for example through a sale. Optionally such determinations are performed according to parameters provided by the digital certificate issuer, such as a brand holder for example. One or more smart contracts may be used, additionally or alternatively, to determine whether such uses and/or transfers are permitted, and/or may enforce the requirements of the parameters associated with the certificate.

Optionally, the owner of the mark or certificate may decide to apply the mark or certificate to a plurality of different virtual goods within one computational system or a plurality of computational systems as described herein. Optionally, one mark or certificate may be applied to such different virtual goods when sold to a plurality of new owners. Such application information and sales information is preferably stored on the blockchain as described herein, and is also preferably controlled through the previously described parameters, for example according to one or more smart contracts.

Figure 8:
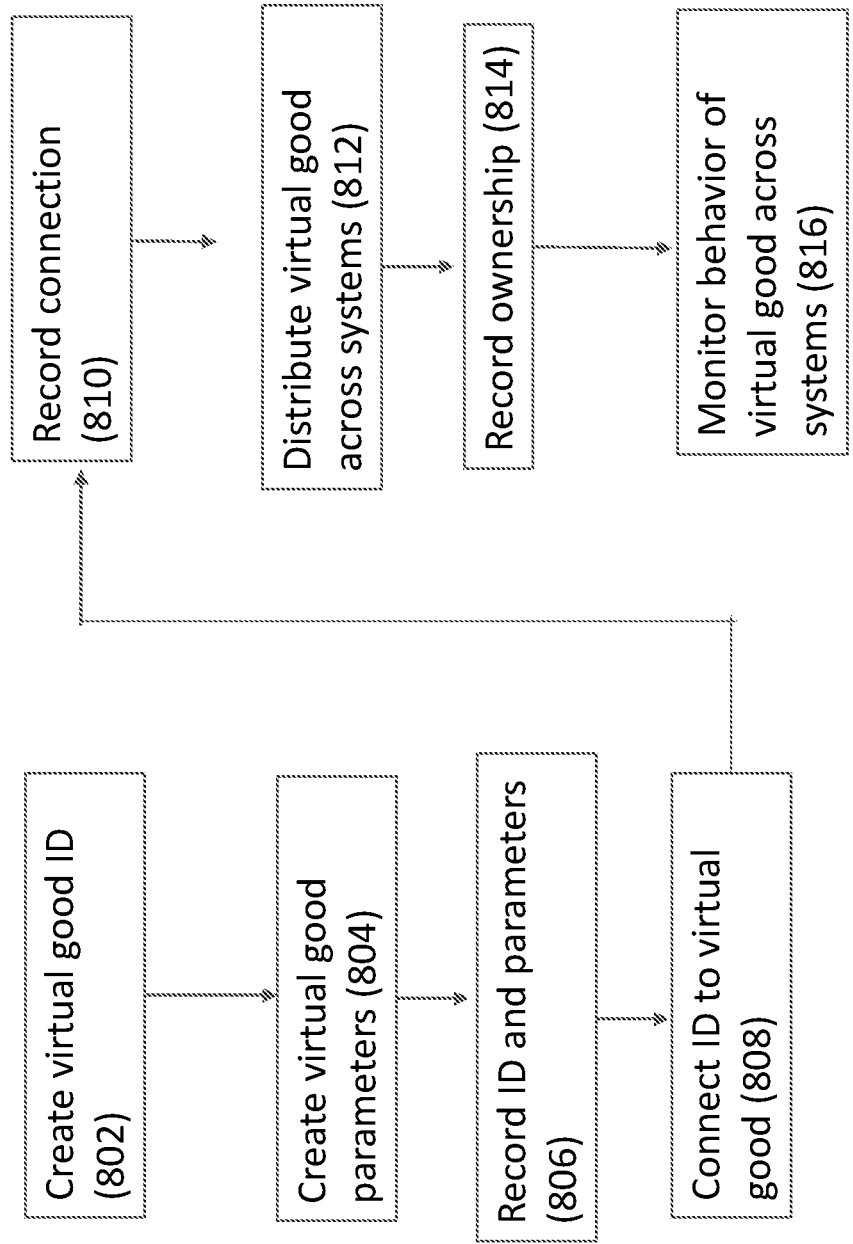
FIG. 8 shows a non-limiting, exemplary method for permitting a virtual good to be authenticated across a plurality of computer systems.

FIG. 8 shows a non-limiting, exemplary method for permitting a virtual good to be authenticated across a plurality of computer systems. As shown in a method 800, the process preferably begins at 802 in which a virtual good ID (identifier) is created, for example as a visual mark, audible mark, mark that is not human readable but otherwise computer readable and the like as described herein. The identifier may be associated with a plurality of copies of a single digital good for example, whether for purchase by a single user or by a plurality of such users.

At 804, one or more virtual good parameters are created. These parameters determine whether the virtual good may be used within a computer system such as that described with regard to FIG. 7, whether as a type of computer system or a particular named computer system. The parameters may govern transfer of the associated digital good, and/or whether digital goods that are not directly provided with the identifier (for example, a good that is designed separately and/or through a provider that is not the identifier issuer, such as a brand for example) may be associated with the identifier. The parameters may also determine whether a plurality of copies of a digital good may be associated with the identifier, and/or whether an owner of a digital good associated with the identifier may use such a digital good across a plurality of computer systems. With regard to the latter use, the parameters may determine whether digital goods instantiated in different technical implementations, such as across a plurality of video games, may be associated with a particular identifier. If permitted, a user could own a digital good and then use it across the plurality of video games, optionally even if the technical implementations were not directly compatible.

At 806, the virtual good ID and the parameters are recorded, for example in a database and/or blockchain, or any other suitable storage system.

At 808, the virtual good ID is connected to at least one digital good, whether as a single copy or as one of a plurality of copies of a digital good. The connection may be controlled according to the previously described virtual good parameters, for example as determined by the licensor. For example, the licensor may determine that only a digital good of a particular appearance may be associated with the virtual good ID. The licensor may also permit a designer to attach the virtual good ID to one or more digital goods designed by the designer, rather than by the licensor, again optionally according to one or more parameters that may restrict the ability of the designer to attach it to a particular designed good. For example, the designer may only be able to attach it to a digital good that has the appearance of a handbag or item of clothing, or the designer may only be able to attach it to a digital good that is considered to be a sufficient close replica of a physical good. Optionally, one or more parameters may relate to the avoidance of offensive features of the digital good, for example with regard to the word(s) used in a slogan on or associated with the digital good.

Optionally the virtual good ID is connected to a virtual good that in turn forms part of another virtual good, such as for example a visual logo that is attached to a digital good. Restrictions on such a combination may be determined according to one or more parameters, as described above.

At 810, the connection is preferably recorded, for example in a database and/or on a blockchain. Optionally a smart contract governs recording of such a connection, for example to permit greater control by a brand owner issuing and/or certifying the virtual good ID in terms of the parameters used and/or subsequent application of the virtual good ID.

At 812, the virtual good is optionally distributed across a plurality of computer systems, for example as described with regard to FIG. 7. Ownership of the virtual good may be recorded at 814, or alternatively may be recorded before distribution of the virtual good. At 816, the behavior of the virtual good, and/or of the owner of that virtual good in regard to using the virtual good, may be monitored across the plurality of computer systems, for example to verify that the usage and/or behavior complies with the previously described parameters. Again, such monitoring may be performed through one or more smart contracts.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system to permit brand owners to maintain control over their valuable brands in a virtual economy for a virtual good, comprising a user computational device, said user computational device comprising a user device memory and a user device processor; and a server in communication with said user computational device, said server comprising a server memory and a server processor; wherein each of said user device processor and said server processor is configured to perform a defined set of operations in response to receiving a corresponding instruction selected from a predefined native instruction set of codes, said codes comprising a first set of machine codes selected from the native instruction set for receiving a request, from the user computational device to the server, to use a virtual good within a computer system; a second set of machine codes selected from the native instruction set for analyzing the request and for reviewing information to determine whether the virtual good may be used within the computer system by the server, wherein the virtual good is associated with a mark or a certificate, and wherein said mark or certificate is associated with a plurality of parameters, wherein said request for verification includes an identification of at least one computer system in which the virtual good may be used, and wherein said server processor executes at least one instruction to determine if said parameters indicate that a requested use is permitted according to said identification of said at least one computer system; and a third set of machine codes selected from the native instruction set to enable the virtual good to be accessed through said user computational device, if said requested use is permitted; wherein each of the first, second and third sets of machine code is stored in the user device memory or in the server memory, and is executed by the user device processor or the server processor.

2. The system of claim 1, wherein said at least one computer system comprises a plurality of computer systems selected from the group consisting of a plurality of virtual worlds, a plurality of online or offline video games, one or more metaverses or spaces within a metaverse, other digital spaces, or a combination thereof.

3. The system of claim 2, wherein said server monitors usage of the virtual good across said plurality of computer systems.

4. The system of claim 1, wherein said mark or certificate identifies a plurality of different virtual goods and is associated with said parameters for said plurality of different virtual goods.

5. The system of claim 1, wherein the virtual good has both an associated mark and an associated certificate, and wherein said associated mark is visible or is capable of being rendered as visible within said computer system.

6. The system of claim 1, further comprising a blockchain, wherein said parameters associated with said mark, said certificate or both are stored on said blockchain, and wherein permission to access the virtual good is determined according to a smart contract executed through said blockchain, according to said parameters and according to said mark, said certificate or both.

7. The system of claim 1, further comprising a mark to permit legitimate branded items to be identified, wherein said server comprises an analysis engine to identify said mark in relation to said legitimate branded items, said analysis engine being operated by said server processor according to codes stored in said server memory; wherein said server processor further executes instructions to authenticate said virtual good.

8. The system of claim 7, wherein said user computational device further comprises a user input device, wherein said user input device receives input commands, and said analysis engine determines said authentication of said virtual good according to an input request through said user input device.

9. The system of claim 7, wherein said user computational device further comprises an AR engine, wherein said AR engine is operated by said user device processor according to codes stored in said user device memory, and said analysis engine determines said authentication of said virtual good according to an automatic request from said AR engine.

10. The system of claim 9, wherein said user computational device further comprises a display and said AR engine causes branding information about said virtual good to be visually displayed by said display.

11. The system of claim 7, wherein said user computational device comprises a VR headset and a VR console, wherein said VR console comprises said user device processor and said user device memory, and wherein said VR console causes branding information about said virtual good to be visually displayed by said VR headset.

12. The system of claim 7, wherein said server further comprises a certification engine operated by said server processor according to codes stored in said server memory, and a certification database for storing authentication information, and wherein said certification engine determines an authentication of said virtual good according to said certification database.

13. The system of claim 12, wherein said certification database comprises a blockchain, wherein said authentication information is stored on said blockchain.

14. The system of claim 13, wherein said codes for said certification engine comprise codes for identifying non-legitimate, "fake" or fraudulent branded items according to information stored on said blockchain.

15. The system of claim 14, further comprising at least one additional server to operate a plurality of virtual worlds, and wherein said information stored on said blockchain determines authenticity of said virtual good for said plurality of virtual worlds.

16. The system of claim 7, wherein said branded items comprise one or more of any suitable type of trademark.

17. The system of claim 16, wherein said trademark comprises a word mark, color, logo, slogan or any other suitable type of trademark; any object designed by or associated with the brand; or any item featuring any component or material that is trademarked, patented or copyrighted; or a combination thereof.

18. The system of claim 7, further comprising a storage in communication with said analysis engine, wherein the mark is associated with information stored in said storage, wherein said storage comprises a blockchain implemented storage.

19. The system of claim 18, wherein one or more transactions related to the branded item are recorded in the storage.

20. The system of claim 19, wherein said one more or more transactions comprise one or more of creation of the item, association with the mark, transfer of the item through sale, licensing and the like, and legitimate use of the branded item.

21. A method for determining legitimacy of a branded item in a virtual economy through the system according to any of the above claims, comprising associating the branded item with a mark, recording said mark in a storage, and analyzing whether the branded item is legitimate according to information retrieved from said storage and analyzed by an analysis engine.

* * * * *